(12) United States Patent
Kim et al.

(10) Patent No.: US 8,596,891 B2
(45) Date of Patent: Dec. 3, 2013

(54) CAMERA MODULE

(75) Inventors: Ju Chul Kim, Gyunggi-do (KR); Ho Kyoum Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/350,920

(22) Filed: Jan. 16, 2012

(65) Prior Publication Data

US 2013/0114952 A1    May 9, 2013

(30) Foreign Application Priority Data

Nov. 7, 2011  (KR) .......................... 10-2011-0115258

(51) Int. Cl.
*G03B 17/02*        (2006.01)
(52) U.S. Cl.
USPC .......................................... 396/419; 396/429
(58) Field of Classification Search
USPC ......................................................... 396/419
See application file for complete search history.

(56) References Cited

U.S. PATENT DOCUMENTS

| | | | |
|---|---|---|---|
| 7,412,163 B2 * | 8/2008 | Wu | ................................. 396/429 |
| 7,430,013 B2 | 9/2008 | Yang et al. | |
| 7,528,885 B2 * | 5/2009 | Chou | ............................. 348/373 |
| 7,611,294 B2 * | 11/2009 | Shi et al. | ........................ 396/428 |
| 7,627,342 B2 * | 12/2009 | Kang | ........................... 455/556.1 |
| 7,773,876 B2 * | 8/2010 | Westerweck et al. | ......... 396/535 |
| 7,927,026 B2 * | 4/2011 | Zhang | ............................ 396/428 |
| 8,317,415 B2 * | 11/2012 | Chang | ........................... 396/428 |
| 2006/0268157 A1 | 11/2006 | Chang | |
| 2008/0194290 A1 * | 8/2008 | Lebert et al. | ............... 455/556.1 |
| 2009/0039734 A1 | 2/2009 | Takahashi et al. | |

FOREIGN PATENT DOCUMENTS

| | | |
|---|---|---|
| JP | 2004260631 A  * | 9/2004 |
| KR | 10-2003-0051266 | 6/2003 |
| KR | 10-2010-0081095 | 7/2010 |

OTHER PUBLICATIONS

Office Action dated Nov. 19, 2012 for related Korena Patent Application No. 10-2011-0115258 and its English summary.
Applicant-provided European Search Report issued for related European Patent Application No. 12151295.8, dated May 3, 2013.

* cited by examiner

*Primary Examiner* — Clayton E Laballe
*Assistant Examiner* — Leon W Rhodes, Jr.
(74) *Attorney, Agent, or Firm* — Ladas & Parry, LLP

(57) ABSTRACT

Disclosed herein is a camera module including: a lens part including a lens; a housing having the lens part coupled thereto; a bracket coupled to the housing; and a shaft mounted in the bracket and driving the lens part and the housing.

13 Claims, 4 Drawing Sheets

CAMERA MODULE

CROSS REFERENCE TO RELATED APPLICATION

This application claims the benefit of Korean Patent Application No. 10-2011-0115258, filed on Nov. 7, 2011, entitled "Camera Module", which is hereby incorporated by reference in its entirety into this application.

BACKGROUND OF THE INVENTION

1. Technical Field

The present invention relates to a camera module.

2. Description of the Related Art

A camera needs to be mounted in order to perform a video call or video conference using a television (TV). However, an edge of the TV tends to become thinner.

Therefore, it is required to miniaturize the camera in order to mount the camera in the TV rather than adding an external camera.

In addition, since it is difficult to satisfy various face positions such as a sitting person, a standing person, a tall person, and a short person at an appropriate angle of view of the camera, vertical rotation of the camera is required.

In order to manufacture a structure for the vertical rotation of the camera, generally, a structure having a size larger than that of the camera should be used. However, in order to mount the camera in the TV, it is important in view of a design to manufacture a rotation structure without increasing a size of a camera part in order to meet the miniaturization of the camera.

In the camera module according to the prior art, in order to rotate the camera, a scheme of assembling a camera module in a case larger than the camera module and rotating the case to adjust an angle of the camera has been mainly used.

Therefore, a rotation structure of a camera having a dimension smaller than a limited dimension (length and height) in mounting the camera in the TV is proposed.

SUMMARY OF THE INVENTION

The present invention has been made in an effort to provide a camera module capable of being mounted in a television (TV) having a thin edge by having a rotation structure of a camera minimized in a limited space.

According to a preferred embodiment of the present invention, there is provided a camera module including: a lens part including a lens; a housing having the lens part coupled thereto; a bracket coupled to the housing; and a shaft mounted in the bracket and driving the lens part and the housing.

Each of the bracket and the shaft may be disposed to be symmetric to each other at both sides of the lens part.

The shaft may include a saw-toothed wheel shaped gear part mounted at one side thereof.

The bracket may be formed integrally with the housing.

The shaft may include a flexible printed circuit board mounted to be wound around an outer peripheral surface thereof.

The shaft may be vertically separated, and the flexible printed circuit board may exit from the center of the shaft and be wound around the shaft.

The lens part may be coupled to the housing by a screw thread.

The flexible printed circuit board may be wound around the shaft once.

The shaft may include a circular part mounted at one side thereof.

The housing may be provided with an inner diameter part in which the lens part is mounted and a groove part in which the bracket and the shaft are mounted.

The bracket may be mounted to be symmetric to each other in the housing in a horizontal direction of an edge portion of the housing having the lens part embedded therein.

The shaft may be formed to be symmetric to each other in a horizontal direction of the bracket.

The shaft may be mounted in the bracket through any one of press-fitting, bonding, or an adhesive tape.

According to another preferred embodiment of the present invention, there is provided a camera module including: a lens part including a lens; a bracket coupled integrally with a housing having the lens part coupled thereto; and a shaft mounted in the bracket and driving the lens part and the housing.

Each of the bracket and the shaft may be disposed to be symmetric to each other at both sides of the lens part.

The shaft may include a saw-toothed wheel shaped gear part mounted at one side thereof.

The shaft may include a flexible printed circuit board mounted to be wound around an outer peripheral surface thereof.

According to still another preferred embodiment of the present invention, there is provided a camera module including: a lens part including a lens; and a shaft coupled integrally with a bracket, the bracket being coupled integrally with a housing having the lens part coupled thereto.

Each of the bracket and the shaft may be disposed to symmetric to each other at both sides of the lens part.

The shaft may include a saw-toothed wheel shaped gear part mounted at one side thereof.

DESCRIPTION OF THE PREFERRED EMBODIMENTS

Figure 1:
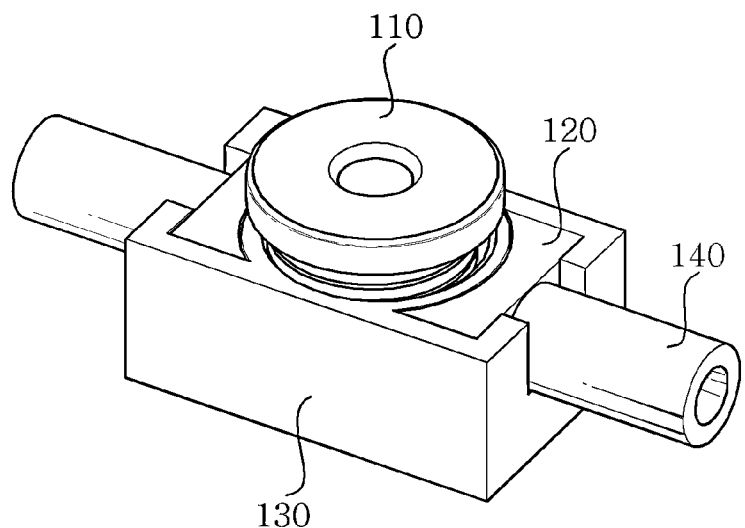
FIG. 1 is a perspective view of a camera module according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
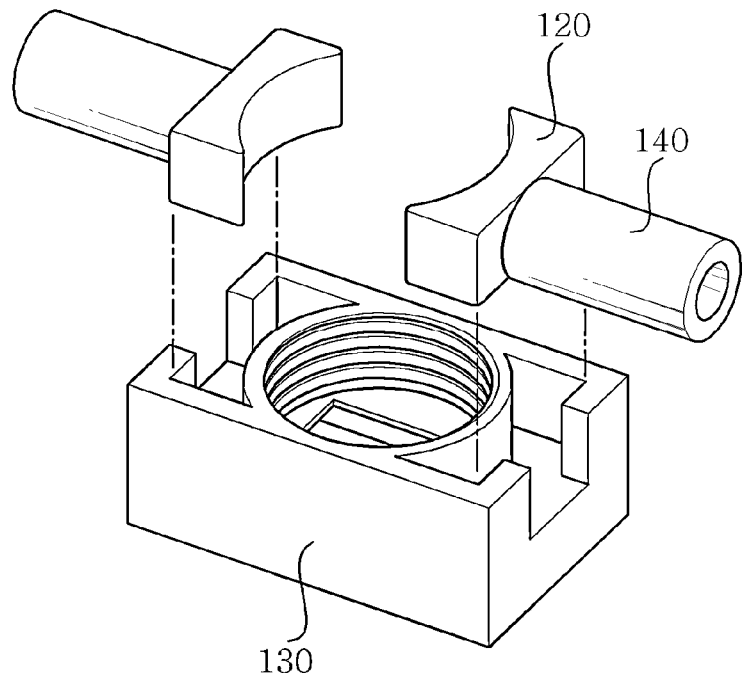
FIG. 2 is an exploded view of the camera module according to the preferred embodiment of the present invention.

FIG. 1 is a perspective view of a camera module according to a preferred embodiment of the present invention; and FIG. 2 is an exploded view of the camera module according to the preferred embodiment of the present invention.

Figure 3:
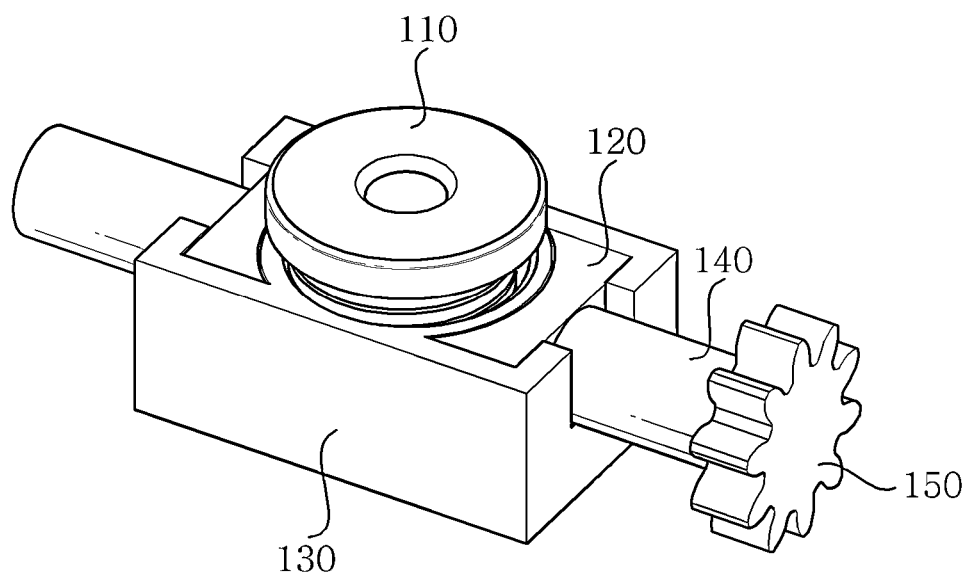
FIG. 3 is a perspective view of a camera module according to another preferred embodiment of the present invention.
Figure 4:
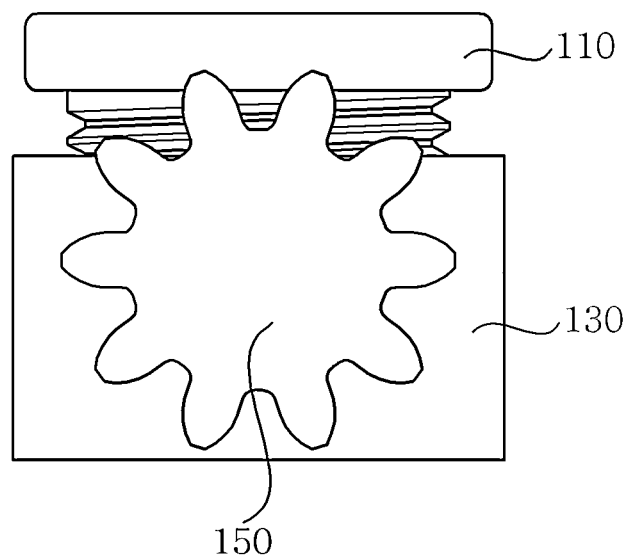
FIG. 4 is a side view of the camera module according to another preferred embodiment of the present invention.

FIG. 3 is a perspective view of a camera module according to another preferred embodiment of the present invention; and FIG. 4 is a side view of the camera module according to another preferred embodiment of the present invention.

Figure 5:
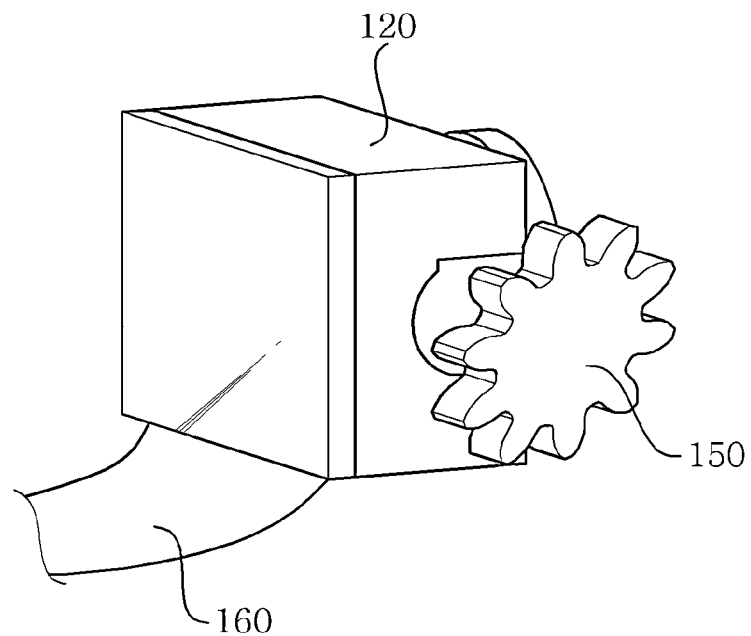
FIG. 5 is a partially enlarged view of the camera module according to another preferred embodiment of the present invention.
Figure 6:
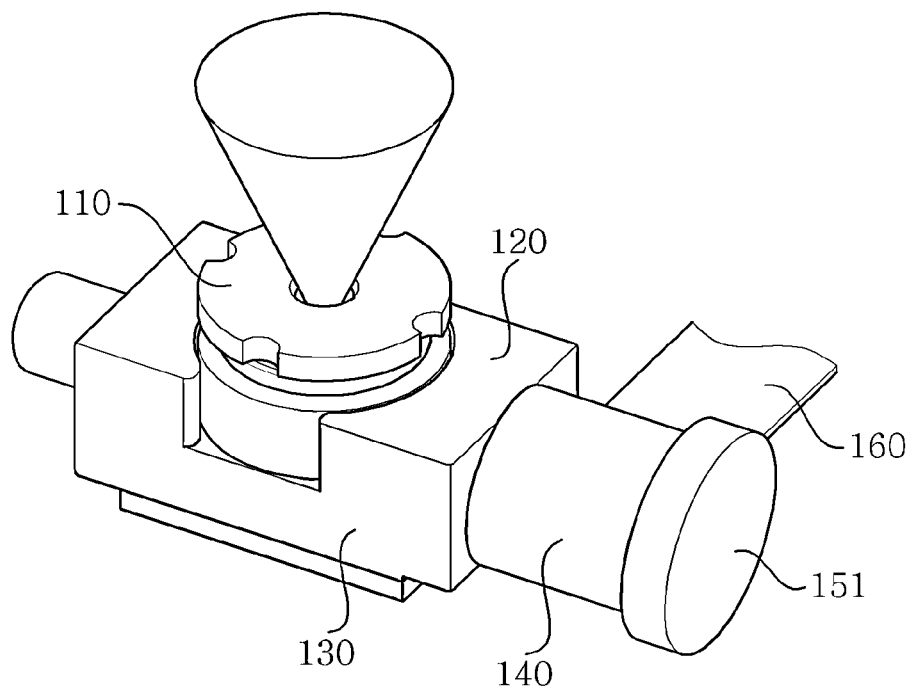
FIG. 6 is a perspective view of the entire camera module according to a preferred embodiment of the present invention.

FIG. 5 is a partially enlarged view of the camera module according to another preferred embodiment of the present invention; and FIG. 6 is a perspective view of the entire camera module according to a preferred embodiment of the present invention.

Figure 7:
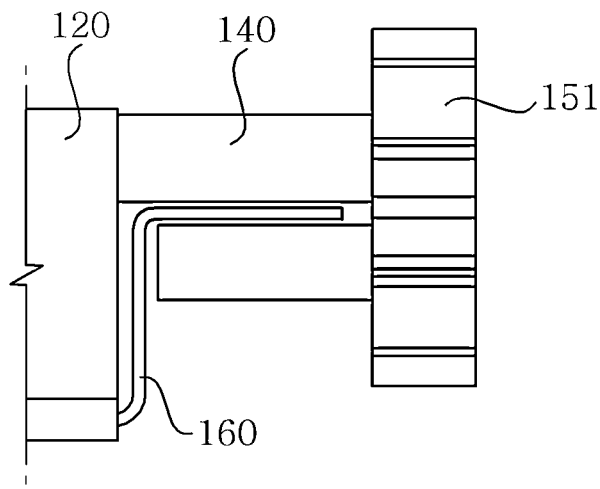
FIG. 7 is one side view of the camera module according to the preferred embodiment of the present invention.
Figure 8:
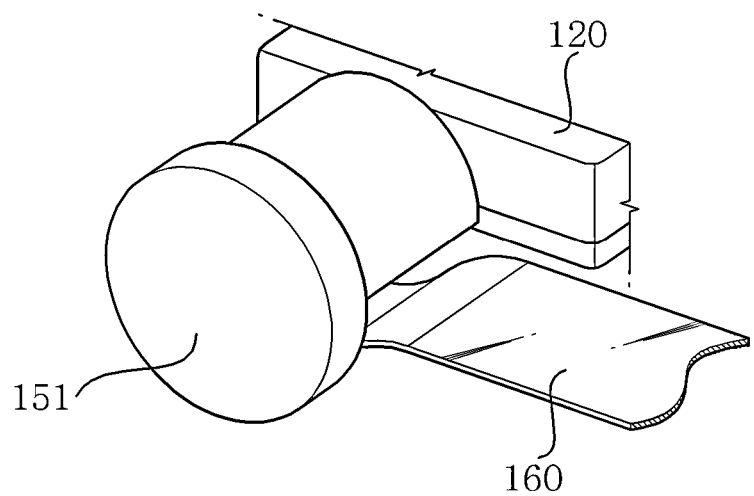
FIG. 8 is a partially enlarged view of the camera module according to the preferred embodiment of the present invention.

FIG. 7 is one side view of the camera module according to the preferred embodiment of the present invention; and FIG. 8 is a partially enlarged view of the camera module according to the preferred embodiment of the present invention.

As shown in FIG. 1, which is a perspective view of a camera module 100 according to a preferred embodiment of the present invention, the camera module 100 according to the preferred embodiment of the present invention is related to a camera module to be mounted in a television (TV) and is configured to include a lens part 110, a bracket 120, a housing 130, and a shaft 140.

The camera module 100 is characterized in that it has the shaft 140 added thereto without increasing a side area. Therefore, a length and a height, which are the most important restrictive conditions in mounting the camera module at an edge of the TV, are not changed.

The lens part 110, which is formed by stacking a plurality of lens, has a screw thread formed in an outer diameter thereof to thereby be assembled to a screw thread formed in an inner diameter of the housing 130.

The bracket 120 is embedded in the housing 130, encloses an inner diameter portion of the housing 130 in which the lens part 110 is mounted, and includes the shaft 140 mounted therein in a horizontal direction.

The housing 130 includes the lens part 110 embedded in the inner diameter thereof and the bracket 120 embedded therein in a horizontal direction of an inner diameter edge thereof in which the lens part 110 is mounted. The housing 130 encloses outer diameters of the lens part 110 and the bracket 120 to thereby serve to protect the lens part 110 and the bracket 129 from external impact.

The shaft 140 is mounted in the horizontal direction of the bracket 120 and controls rotation of the camera module 100 when the camera module 100 is mounted in the TV.

Although the bracket 120 in which the shaft 140 is embedded may be manufactured integrally with the housing 130, in consideration of a level of difficulty of a mold, a deformation degree of an injection molding product, space utilization during a process of manufacturing the camera module, or the like, it is more efficient to separately separate parts from each other, complete the camera module, and then adhere the shaft 140 to the bracket 120.

As a method of adhering the shaft 140 to the bracket 120, a method of forming a hole in the bracket 120 and then press-fitting the shaft 140 into the hole, a method of bonding the shaft 140 to the bracket 120 by a bonding agent, a method of adhering the shaft 140 to the bracket 120 by an adhesive tape having strong adhesion, or the like, may be used.

An actually designed high definition (HD) small camera module has a dimension to be described. A camera module having a general structure has a size of 4.5 (length)×6.0 (width)×4.3 (thickness); however, a camera module to which a rotation structure is applied has a size of 4.5 (length)×14.0 (width)×4.3 (thickness).

The shaft 140 is mounted in the bracket 120 as described above, such that an increase in a width of the camera module is inevitable. However, a TV edge has a margin in a width direction, such that it is free in view of a dimension.

FIG. 2 is a perspective view showing a state in which the bracket 120 having the shaft 140 mounted therein is separated from the housing 130 of the camera module 100 according to the preferred embodiment of the present invention.

As shown in FIG. 2, in the camera module 100 according to the preferred embodiment of the present invention, the lens part (not shown) is screwed to the inner diameter of the housing 130 and the bracket 120 is embedded in the housing 130 in the horizontal direction of the inner diameter edge of the housing 130 in which the lens part 110 is mounted. In addition, the shaft 140 is mounted to be symmetric to each other in the horizontal direction of the bracket 120.

As described above, the housing 130 is provided with the inner diameter part having the screw thread formed at a central portion thereof so that the lens part 110 is mounted therein and is provided with a groove part in the horizontal direction based on an edge of the inner diameter part, wherein the groove part has the bracket 120 and the shaft 120 mounted therein.

FIG. 3 is a perspective view of a camera module according to another preferred embodiment of the present invention, wherein a structure in which a gear part 150 is added to one side of the shaft 140 to confine rotational force transferred from the outside in the camera module 100 is implemented. The gear part 150 has a shape and a size limited within a side area range of the camera module and may have a saw-toothed wheel shape.

FIG. 4 is a side view of the camera module according to another preferred embodiment of the present invention shown in FIG. 3.

FIG. 5 shows that a flexible printed circuit board (FPCB) 160 of the camera module according to another preferred embodiment of the present invention exits to a rear surface rather than exiting through the shaft. However, in the case in which a rear surface space of the camera module needs to be used, the flexible printed circuit board 160 needs to exit to a side of the camera module. In addition, as a rotation angle of the camera increases, it is structurally advantageous that the flexible printed circuit board 160 is wound around the shaft 140 once.

FIG. 6 shows that the flexible printed circuit board 160 connecting the camera module according to another preferred embodiment of the present invention and the TV to each other is wound around the shaft 140 once and then exits from the shaft 140.

When the flexible printed circuit board 160 is wound around the shaft 140 once and then exits from the shaft 140, noise that may occur due to rotation interference for a margin length of the flexible printed circuit board 160 during rotation of the camera may be removed. In addition, a damage in the flexible printed circuit board 160 due to accumulation of stress caused by the use for a long period of time may be avoided.

The gear part 150 of FIG. 5 mounted on the side of the shaft 140 may be mounted as a circular part 151 as shown in FIG. 6.

FIG. 7 is a partially enlarged view of the camera module according to the preferred embodiment of the present invention and shows a structure in which the shaft 140 having the flexible printed circuit board 160 wound therearound is vertically separated, such that the flexible printed circuit board 160 exits from the center of the shaft 140.

FIG. 8 is an enlarged view showing a structure in which the flexible printed circuit board 160 is wound around the shaft 140 while exiting from the center of the shaft 140 in the camera module according to the preferred embodiment of the present invention.

As described above, in the camera module according to the preferred embodiment of the present invention, the rotation structure of the camera is minimized in the limited space, thereby making it possible to allow the camera module to be mounted in a TV having a thin edge. That is, since the shaft 140 is mounted in the horizontal direction of the bracket 120, the side area of the camera module is not increased, such that the length and the height of the camera module are not changed.

In addition, the structure in which the flexible printed circuit board 160 is wound around the shaft 140 is provided, thereby making it possible to prevent the flexible printed circuit board 160 from being torn due to accumulation of stress caused by the rotation use for a long period of time.

Furthermore, the possibility that noise will occur due to interference of the flexible printed circuit board at the time of rotation of the camera module may be blocked.

Although the embodiment of the present invention has been disclosed for illustrative purposes, it will be appreciated that a camera module according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A camera module comprising:
a lens part including a lens;
a housing having the lens part coupled thereto;
at least two brackets coupled to the housing; and
at least two shafts mounted in the brackets and driving the lens part and the housing,
wherein the housing is provided with an inner diameter part in which the lens part is mounted and a groove part in which the brackets and the shafts are mounted.

2. The camera module as set forth in claim 1, wherein each of the brackets and the shafts is disposed to be symmetric to each other at both sides of the lens part.

3. The camera module as set forth in claim 1, wherein the shaft includes a saw-toothed wheel shaped gear part mounted at one side thereof.

4. The camera module as set forth in claim 1, wherein the bracket is formed integrally with the housing.

5. The camera module as set forth in claim 1, wherein the shaft includes a flexible printed circuit board mounted to be wound around an outer peripheral surface thereof.

6. The camera module as set forth in claim 5, wherein the shaft is vertically separated, and the flexible printed circuit board exits from the center of the shaft and is wound around the shaft.

7. The camera module as set forth in claim 1, wherein the lens part is coupled to the housing by a screw thread.

8. The camera module as set forth in claim 5, wherein the flexible printed circuit board is wound around the shaft once.

9. The camera module as set forth in claim 1, wherein the shaft includes a circular part mounted at one side thereof.

10. The camera module as set forth in claim 1, wherein the brackets are mounted to be symmetric to each other in the housing in a horizontal direction of an edge portion of the housing having the lens part embedded therein.

11. The camera module as set forth in claim 1, wherein the shafts are formed to be symmetric to each other in a horizontal direction of the brackets.

12. The camera module as set forth in claim 1, wherein the shaft is mounted in the bracket through any one of press-fitting, bonding, or an adhesive tape.

13. The camera module as set forth in claim 1, wherein the shaft is coupled integrally with the bracket.

* * * * *